(12) United States Patent
Schroeder et al.

(10) Patent No.: US 6,629,195 B2
(45) Date of Patent: Sep. 30, 2003

(54) IMPLEMENTING SEMAPHORES IN A CONTENT ADDRESSABLE MEMORY

(75) Inventors: Jacob J. Schroeder, Lyngey (DK); Magnussen Andreas, Fredensborg (DK); Jens K. Andreassen, Lyngey (DK); Steen V. Kock, Copenhagen (DK)

(73) Assignee: Intel Corporation, Santa Clara, CA (US)

( * ) Notice: Subject to any disclaimer, the term of this patent is extended or adjusted under 35 U.S.C. 154(b) by 214 days.

(21) Appl. No.: 09/892,285

(22) Filed: Jun. 26, 2001

(65) Prior Publication Data

US 2002/0199057 A1 Dec. 26, 2002

(51) Int. Cl.[7] ............................................. G06F 12/08
(52) U.S. Cl. ....................................... 711/108; 711/152
(58) Field of Search ................................ 711/108, 152; 709/200–253

(56) References Cited

U.S. PATENT DOCUMENTS 6,148,300 A * 11/2000 Singhal et al. ................. 707/8

OTHER PUBLICATIONS

Berny Goodheart and James Cox, The Magic Garden Explained, Copyright 1994, Prentice Hall, Release 4, Chapter 8: pp. 540–541.*

Alteral Corporation, Technical Brief 56, "Using APEX 20KE CAM for Fast Search Applications", Aug. 1999, ver.1, p. 2.*

* cited by examiner

Primary Examiner—Reginald G. Bragdon
Assistant Examiner—Midys Inoa
(74) Attorney, Agent, or Firm—Pillsbury Winthrop LLP

(57) ABSTRACT

A network processor application-specific integrated circuit (ASIC) includes a plurality of processor devices each adapted to generate a semaphore operation request. A request arbiter, having connections to the plurality of processor devices, is provided to determine the semaphore operation request from one of the plurality of processor devices to be forwarded. A content addressable memory (CAM) is provided to store a data set. A CAM control state machine interconnects the request arbiter and the CAM, and implements a semaphore operation requested by one of the plurality of processor devices to the content addressable memory to access the data set.

16 Claims, 2 Drawing Sheets

IMPLEMENTING SEMAPHORES IN A CONTENT ADDRESSABLE MEMORY

BACKGROUND OF THE INVENTION

1. Field of the Invention

The present invention generally relates to memory devices. More specifically, the present invention relates to content addressable memory (CAM) devices and implementing semaphores therein.

2. Discussion of the Related Art

In networking applications, fast searches of a database, table, or list, such as in an Ethernet address lookup operation, allow for improved performance. These databases, tables, or lists are often stored in memory devices, such as random access memory (RAM). Memory devices typically store and retrieve data by addressing specific memory locations. However, due to this approach, the speed of memory access is often compromised. A more efficient approach is to locate a piece of stored data by identifying it with the content of the data itself, rather than by its address.

Content addressable memory (CAM), which is an outgrowth of RAM technology, provides a performance advantage over conventional memory devices in that it is able to compare the desired information against the entire list of pre-stored entries simultaneously, resulting in an order-of-magnitude reduction in search time. A CAM semiconductor device permits the contents of the memory to be searched and matched instead of having to specify one or more particular memory location(s) in order to retrieve data from the memory. A CAM device may be used to accelerate any application requiring fast searches of a database, list, or pattern, such as in database machines, image or voice processing and recognition, artificial intelligence, pattern recognition, robotics control, computer and communications networks (e.g., high-speed routers and switches), and arithmetic operations. A CAM device provides a performance advantage over conventional memory devices with conventional memory search algorithms, such as binary or tree-based searches, by comparing the desired information against the entire list of entries simultaneously. For example, a binary search through a database of 1,000 entries may take ten separate search steps, whereas a CAM device with 1,000 entries may be searched in a single operation resulting in a search that takes ten times less time. One to example of an application in which CAM devices are often used for a high-speed switching system that needs to rapidly search a routing table to look for a matching destination address so that a data packet may be routed to the appropriate destination address.

A CAM device is organized differently from typical static RAM (SRAM) or dynamic RAM (DRAM) devices. In particular, data in a CAM device is stored in memory locations in somewhat a random fashion. The memory locations may be selected by an address bus, or the data may be written directly into the first empty memory location. Every location has, for example, a pair of special status bits that keep track of whether the location has valid information in it or is empty, and therefore available for overwriting. As opposed to RAM devices in which information is accessed by specifying a particular memory location, once information is stored in a memory location of the CAM, it may be located by comparing every bit in the memory with data placed in a special register known as a compare register. If there is a match of every bit in a particular memory location with every corresponding bit in the register, a "match flag" is asserted to let the user know that the data in the register was found in the CAM device. A priority encoder may sort out which matching memory location has the top priority if there are more than one matching entry, and makes the address of the matching memory location available to the user so that the user may access the matching data. Thus, with a CAM device, the user supplies a piece of data he/she wants to match to the CAM device and gets back the address of any matching pieces of data in the CAM device.

CAMs are also known as associative memories, which operate more intuitively than RAM devices, and somewhat similarly to human memory. An associative memory is generally one that allows its stored information to be retrieved based on a partial knowledge of that information. Accordingly, CAMs are well-suited for various network-related applications, including Ethernet address lookup, high-bandwidth address filtering, and fast lookup of data for high-performance data switches, firewalls, bridges, and routers. In many network-related applications, such as in a network processor application-specific integrated circuit (ASIC), there may be multiple processor units or devices, all of which may access and modify the same data set or record stored in a shared memory. However, it must be assured that only one processor is working on a specific record at a time, or else the data set or record may become corrupted. Therefore, in order to properly employ CAM devices in network-related applications utilizing multiple processors, for example, it is preferable to utilize a mechanism to control access to a particular data set stored in a memory shared by multiple processors.

DETAILED DESCRIPTION

Figure 1:
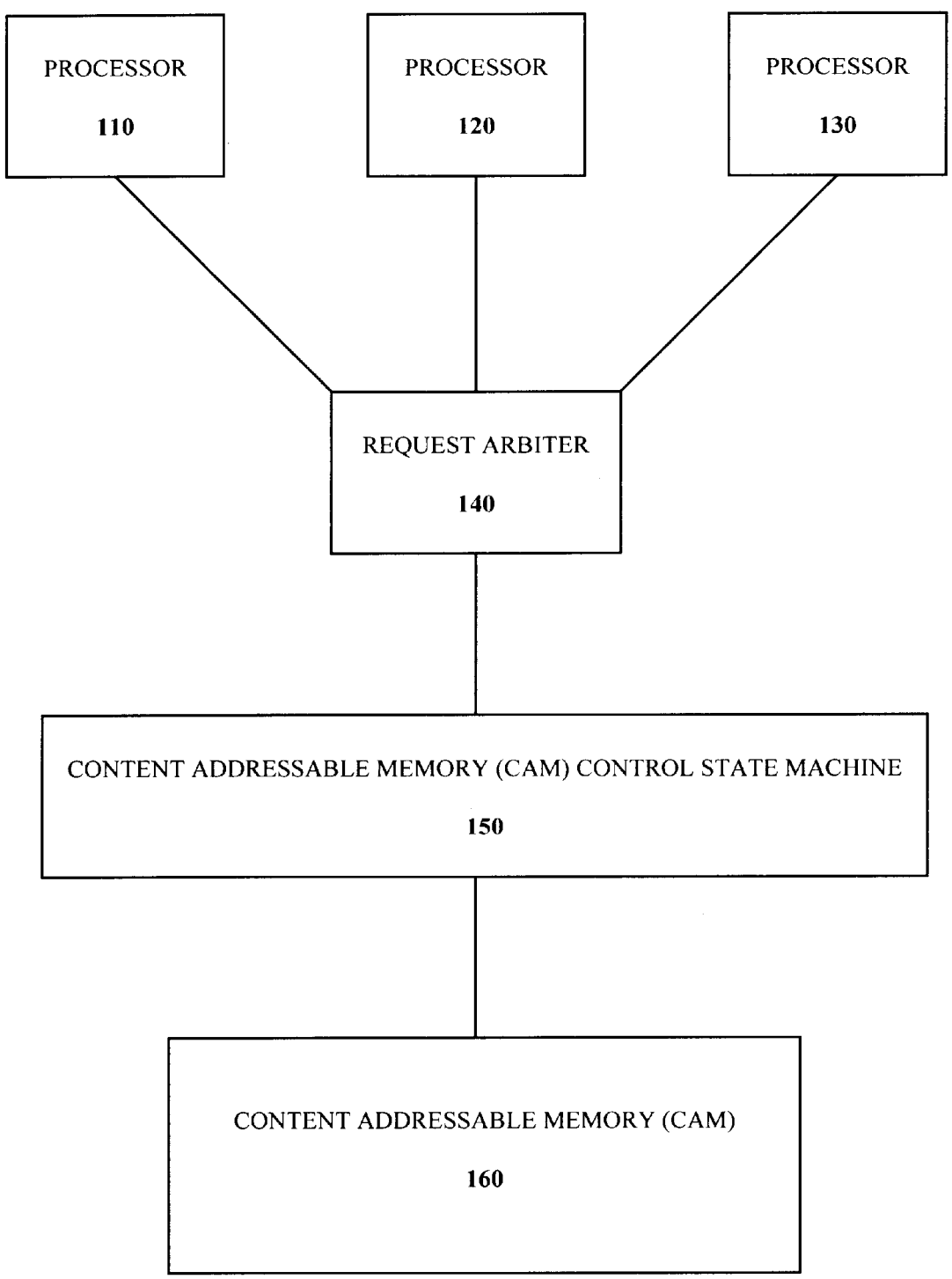
FIG. 1 illustrates a network processor application-specific integrated circuit (ASIC) according to an embodiment of the present invention.

FIG. 1 illustrates a network processor application-specific integrated circuit (ASIC) according to an embodiment of the present invention. The network processor ASIC in FIG. 1 has three processor units 110, 120, 130, although any number of processors may be utilized depending on the particular configuration of the ASIC. In one embodiment of the present invention, the processors 110, 120, 130 are embedded in the ASIC.

A content addressable memory (CAM) device 160 is provided as memory storage for the ASIC. The CAM device 160 utilized is preferably of the type that is used for lookup of records based on some key, where the key is placed in the CAM device 160. The CAM device 160 contains one entry for each record with the key for that record.

A CAM control state machine 150 is preferably provided in the ASIC to control access to a particular data set stored in the CAM device 160, which is shared by the processors 110, 120, 130. More specifically, semaphores are implemented in the CAM device 160 to control access between a plurality of processors 110, 120, 130 to a data set stored in the CAM device 160. In general, semaphores are implemented to provide a number to present counters used to control access to shared resources by multiple processors. Semaphores are commonly used as a locking mechanism to prevent processors from accessing a particular resource while another processor is performing operations on it.

Generally, a semaphore is an integer that can vary between zero and some predetermined positive number n, where n is the number of "requesters" allowed simultaneous use of the resource. In the case of a binary semaphore, n=1 and only one "requester" (e.g., one of processor units 110, 120, 130) can use the resource at a time. Initially the semaphore value is set at n. To obtain access to a resource, a requester "tests" the current value of the semaphore. If the current value is greater than zero, the requester decrements the current value by one and proceeds to use the resource. If the current value is zero, on the other hand, the requester is suspended (i.e., goes to "sleep") and is put in a queue as a "waiter" for the semaphore. To release a resource, the requester increments the semaphore value by one. In addition, if there are any waiters in the queue for the semaphore, one of the waiters is posted, whereupon it again attempts to obtain the resource by testing the semaphore as it did initially.

Three main operations are utilized to implement semaphores: (1) "test and set", (2) a "clear", and (3) "test". In the semaphore "test and set" operation, the CAM device 160 is accessed to match (read) a semaphore with the semaphores in the CAM device 160, and to write a new semaphore into the CAM device 160 if the semaphore for a particular data set is not already present in the CAM device 160. In other words, if it is determined from execution of the "test and set" operation that the semaphore for a particular data set is already in the CAM device 160, then a SET_FAILED notification is produced. Otherwise, the semaphore is written into the empty CAM device 160 entry for the particular data set, and a SET_SUCCESS notification is produced.

In the semaphore "clear" operation, the CAM device 160 is accessed to match a given semaphore with the semaphores in the CAM device 160 and to locate the entry in the CAM device 160 that the semaphore occupies. Then, the CAM device 160 is accessed to delete or deactivate the entry occupied by the semaphore to "clear" the entry in the CAM device 160. In other words, by executing the "clear" operation, the semaphore entry for a particular data set in the CAM device 160 is deleted, and a CLEAR_SUCCESS notification is produced. Otherwise, a CLEAR_FAILED notification is produced (e.g., the "clear" operation was executed on an entry in the CAM device 160 that did not have a semaphore in the first place).

In the semaphore "test" operation, the CAM device 160 is accessed to match a given semaphore with the semaphores in the CAM device 160. In other words, by executing the "test" operation, if it is determined that the semaphore for a particular data set is already in the CAM device 160, then a TEST_OCCUPIED notification is produced. Otherwise, a TEST_SUCCESS notification is produced, indicating that a new semaphore may be written to the CAM device 160.

By implementing semaphores in CAM devices 160 according to an embodiment of the present invention, a large number of semaphores may be supported by a relatively small CAM device 160. For example, if each CAM entry is M bits wide (e.g., 32 bits wide), then each semaphore is represented by an M bit number and the CAM device 160 may support $2^M$ semaphores. Therefore, if each CAM entry is 32 bits wide, then the CAM device 160 may support over four billion semaphores. Preferably, each semaphore is identified by a SEMAPHORE-ID, which is a depth bit. So, when a semaphore is "locked", its SEMAPHORE-ID is placed in an unused entry in the CAM device 160 as performed by the "test and set" operation. Depth semaphores may be locked in the CAM device 160. According to an embodiment of the present invention, the CAM device 160 has a width of 32 bits and a depth of 64 bits, but any suitable configuration with respect to width and depth may be implemented.

Each processor 110, 120, 130 is adapted to generate semaphore operation requests. A request arbiter 140 interconnects the processors 110, 120, 130 to the CAM control state machine 150. Arbiter circuits 140 are generally included in such systems to prevent collisions between multiple processors 110, 120, 130 simultaneously attempting to access the memory (CAM) device 160. If the memory device 160 is a single-port memory device, only one resource sharing device can access the memory device at a time. Therefore, an arbiter circuit 140 in a system employing such single-port memory devices arbitrates contention by allowing only a contention winning electronic device temporary sole access to the entire memory device. For a dual-port memory device, on the other hand, two electronic devices can concurrently read-access the same location and write-access different locations of the memory device, thus providing nearly twice the bandwidth of a single-port device. Access is only restricted when the electronic devices simultaneously attempt to write-access the same location. Therefore, an arbiter circuit 140 in systems employing such dual-port memory devices arbitrates contention by allowing only a contention winning electronic device temporary sole write-access to the simultaneously requested location. In other words, the request arbiter 140 decides, for a given memory cycle(s), which requester (processor unit 110, 120, 130) will be given access to the memory (CAM) device 160. The CAM control state machine 150 then implements the allowed semaphore operation (e.g., "test", "test and set", and "clear") from one of the processors 110, 120, 130 on the CAM device 160.

Figure 2:
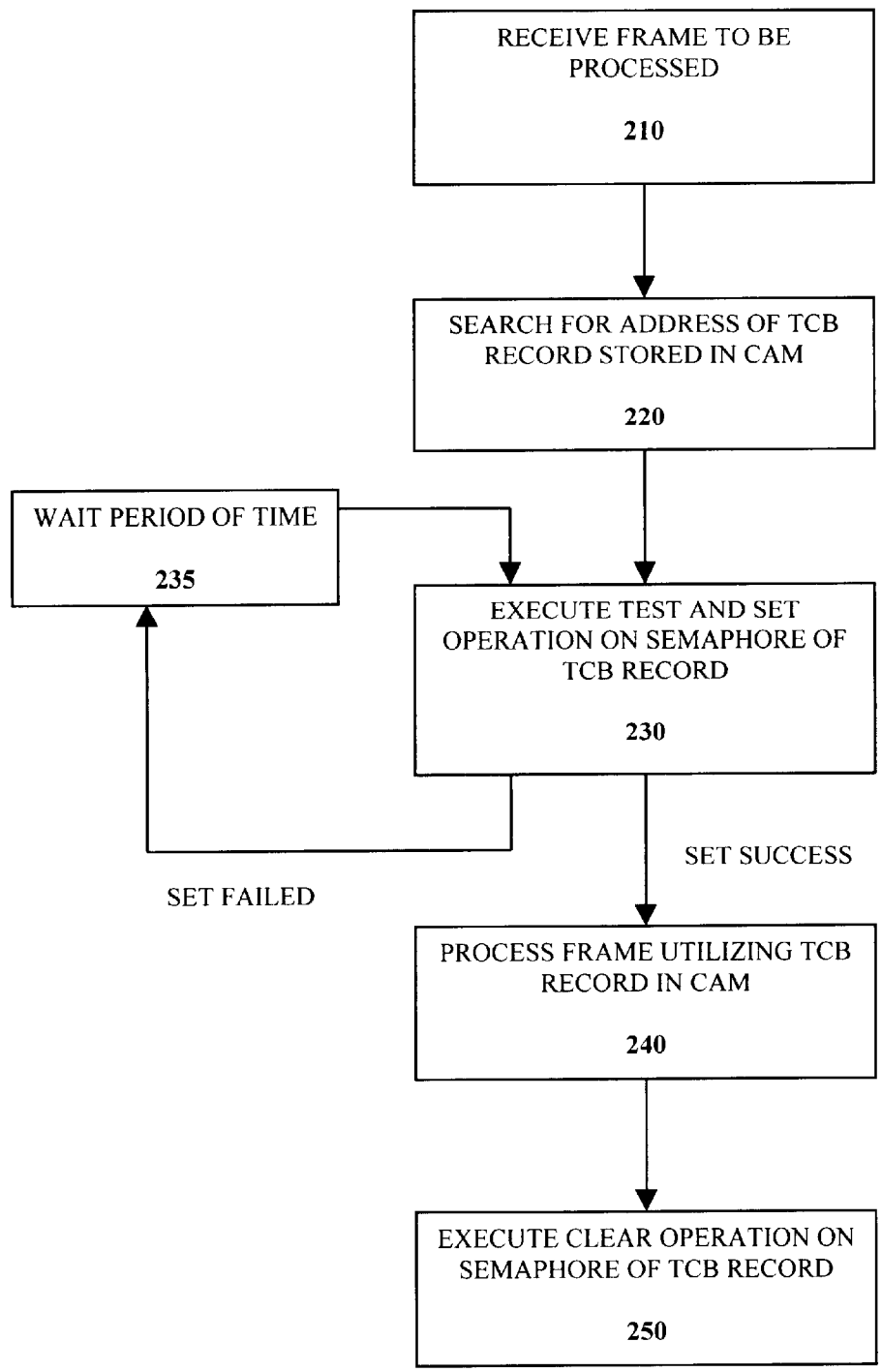
FIG. 2 illustrates a flow chart diagram for operating a network processor device according to an embodiment of the present invention.

FIG. 2 illustrates a flow chart diagram for operating a network processor device according to an embodiment of the present invention. The network processor ASIC of FIG. 1 may be adapted to perform the steps of FIG. 2 to process a Transmission Control Protocol over Internet Protocol (TCP/IP) frame. For each TCP connection, there is a status record called a Transmission Control Block (TCB) record that describes the current state of the TCP protocol for that TCP connection. So, if there are N TCP connections open at a point in time, there will also be N TCB records in the ASIC's memory, such as the CAM device 160.

When a new TCP/IP frame (packet of data) to be processed is received 210 by the ASIC, the frame is forwarded to one of the ASIC's processors 110, 120, 130, which processes the TCP and IP protocols. This processing generally includes multiple reads and writes from and to the TCB record for the TCP connection to which the received frame belongs.

It is possible that two TCP/IP frames for the same TCP connection may be received at virtually (almost) the same time by a network processor device. In this situation, the two frames are directed to two different processors 110, 120, 130 that are to process the TCP protocol of each of the frames. However, accesses of the TCB record from two separate processors 110, 120, 130 are not permitted to interleave each other, because TCP processing is programmed such that only a single frame may be processed at a time for a given TCB record. Accordingly, semaphores are implemented so that access to the TCB record stored on the CAM device 160 is permitted by one processor 110, 120, 130 at a time.

Initially, the two processors will both request "ownership" of the semaphore of that particular TCB record before they each start to process the TCP protocol. Because only one processor can "own" the semaphore at a time, the processor that received ownership of the semaphore (as determined by the request arbiter 140) will then process the TCP protocol, including any reads from or writes to the TCB record. The processor searches 220 for an address of the TCB record corresponding to the frame stored in the CAM device 160. Once the address of the TCB record is determined, a "test and set" operation is executed 230 on the semaphore of the TCB record. Should the SET_FAILED notification appear after the "test and set" operation is executed 230, the processor waits 235 a period of time, and attempts to execute 230 the "test and set" operation again. The "test and set" operation 230 and the waiting operation 235 may be repeated until the set operation is successful (SET_SUCCESS). If the set operation is successful, the frame is then processed 240 utilizing the TCB record, which includes reads from and writes to the TCB record. After the processing 240 is completed, and when the processor has completed all required accesses to the TCB record, it will "release" the semaphore by executing 250 a "clear" operation on the semaphore of that particular TCB record.

The other processor waits on the semaphore until the first processor has completed its processing, and then receives ownership of the semaphore and could now process its frame and perform any accesses to the TCB record. Similarly, when the second processor has completed its processing, it will release the semaphore for that TCB record as well. Although the description above is with respect to a network processor ASIC, implementing semaphores with CAMs may be utilized with any device having multiple processing units that share a common memory in a number of various applications.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A method of implementing semaphores in a content addressable memory (CAM), comprising:
   receiving data to be processed;
   searching for an address of a data set stored in the CAM corresponding to the received data;
   executing a test and set operation on a semaphore associated with the data set in the CAM;
   determining whether the set operation was successful;
   waiting a period of time if the set operation failed;
   processing the received data utilizing the data set stored in the CAM corresponding to the received data if the set operation was successful; and
   executing a clear operation on the semaphore associated with the data set in the CAM after processing the received data.

2. The method according to claim 1, wherein the processing includes reading from or writing to the data set stored in the CAM.

3. The method according to claim 1, further including:
   executing a second test and set operation on the semaphore associated with the data set stored in the CAM after waiting the period of time;
   determining whether the second set operation was successful; and
   waiting a second period of time if the second set operation failed.

4. The method according to claim 1, wherein the data is a frame.

5. The method according to claim 1, wherein the data set is a transmission control block (TCB) record.

6. A processor device, comprising:
   a machine-readable medium; and
   machine-readable program code, stored on the machine-readable medium, having instructions to
   receive data to be processed,
   search for an address of a data set stored in the CAM corresponding to the received data,
   execute a test and set operation on a semaphore associated with the data set in the CAM,
   determine whether the set operation was successful,
   wait a period of time if the set operation failed,
   process the received data utilizing the data set stored in the CAM corresponding to the received data if the set operation was successful, and
   execute a clear operation on the semaphore associated with the data set in the CAM after the received data has been processed.

7. The processor device according to claim 6, wherein the instructions to process include instructions to read from or write to the data set stored in the CAM.

8. The processor device according to claim 6, wherein the machine-readable program code further includes instructions to:
   execute a second test and set operation on the semaphore associated with the data set stored in the CAM after waiting the period of time;
   determine whether the second set operation was successful; and
   wait a second period of time if the second set operation failed.

9. The processor device according to claim 6, wherein the data is a frame.

10. The processor device according to claim 6, wherein the data set is a transmission control block (TCB) record.

11. A method of operating a network processor device, comprising:
    receiving a frame;
    searching for an address of a transmission control block (TCB) record stored in a content addressable memory (CAM) corresponding to the frame;
    executing a test and set operation on a semaphore associated with the TCB record stored in the CAM;
    determining whether the set operation was successful;
    waiting a period of time if the set operation failed;
    processing the frame utilizing the TCB record stored in the CAM corresponding to the frame if the set operation was successful; and
    executing a clear operation on the semaphore associated with the TCB record stored in the CAM after processing the frame.

12. The method according to claim 11, wherein the processing includes reading from or writing to the data set stored in the CAM.

13. The method according to claim 11, further including:
    executing a second test and set operation on the semaphore associated with the TCB record stored in the CAM after waiting the period of time;

determining whether the second set operation was successful; and waiting a second period of time if the second set operation failed.

14. A network processor device, comprising:

a machine-readable medium; and machine-readable program code, stored on the machine-readable medium, having instructions to receive a frame, search for an address of a transmission control block (TCB) record stored in a content addressable memory (CAM) corresponding to the frame, execute a test and set operation on a semaphore associated with the TCB record stored in the CAM, determine whether the set operation was successful, wait a period of time if the set operation failed, process the frame utilizing the TCB record stored in the CAM corresponding to the frame if the set operation was successful, and execute a clear operation on the semaphore associated with the TCB record stored in the CAM after the frame has been processed.

15. The network processor device according to claim 14, wherein the processing includes reading from or writing to the data set in the CAM.

16. The network processor device according to claim 14, wherein the machine-readable program code further includes instructions to:

execute a second test and set operation on the semaphore associated with the TCB record stored in the CAM after waiting the period of time;

determine whether the second set operation was successful; and wait a second period of time if the second set operation failed.

* * * * *

UNITED STATES PATENT AND TRADEMARK OFFICE
CERTIFICATE OF CORRECTION

PATENT NO.    : 6,629,195 B2
DATED         : September 30, 2003
INVENTOR(S)   : Jacob J. Schroeder et al.

It is certified that error appears in the above-identified patent and that said Letters Patent is hereby corrected as shown below:

<u>Title page,</u>
Item [75], Inventors,
The second named inventor's first and last names are transposed. His name should be listed as -- Andreas Magnussen -- instead of "Magnussen Andreas".

Signed and Sealed this

Thirteenth Day of January, 2004

JON W. DUDAS
*Acting Director of the United States Patent and Trademark Office*